No. 811,645. PATENTED FEB. 6, 1906.
E. E. LEHR.
ELECTRICAL MEASURING INSTRUMENT.
APPLICATION FILED NOV. 21, 1903.

2 SHEETS—SHEET 1.

WITNESSES:
F. H. Miller.
Birney Hines

INVENTOR
Edwin E. Lehr
BY
Wesley G. Carr
ATTORNEY

No. 811,645. PATENTED FEB. 6, 1906.
E. E. LEHR.
ELECTRICAL MEASURING INSTRUMENT.
APPLICATION FILED NOV. 21, 1903.

2 SHEETS—SHEET 2.

WITNESSES:
F. H. Miller.
Birney Hines

INVENTOR
Edwin E. Lehr
BY
Wesley G. Carr
ATTORNEY

UNITED STATES PATENT OFFICE.

EDWIN E. LEHR, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

No. 811,645.     Specification of Letters Patent.     Patented Feb. 6, 1906.

Application filed November 21, 1903. Serial No. 182,166.

*To all whom it may concern:*

Be it known that I, EDWIN E. LEHR, a citizen of the United States, and a resident of Wilkinsburg, in the county of Allegheny and State of Pennsylvania, have invented a new and useful Improvement in Electrical Measuring Instruments, of which the following is a specification.

My invention relates to alternating-current electrical measuring instruments, and particularly to instruments of this general class which are employed for indicating the instantaneous values of the current in any given circuit, as distinguished from instruments which are employed for registering or recording the total amount of current or energy traversing a given circuit during a specific interval of time.

The object of my invention is to provide an instrument of the character indicated which is simple, compact, and inexpensive in construction and accurate in operation and the indicating member of which shall have a large arc of movement over a uniform scale.

A further object of my invention is to provide an instrument which is adapted to accurately indicate the current in any alternating-current circuit in which it is connected, irrespective of wave form and frequency of alternations.

The movable member or coil of my instrument constitutes the secondary winding of a series transformer, the currents therein being induced. I am therefore enabled to utilize the principle of the dynamometer and avoid the use of mercury-cups and all other forms of flexible connections to the movable member.

My invention is illustrated in the accompanying drawings, in which—

Figure 1:
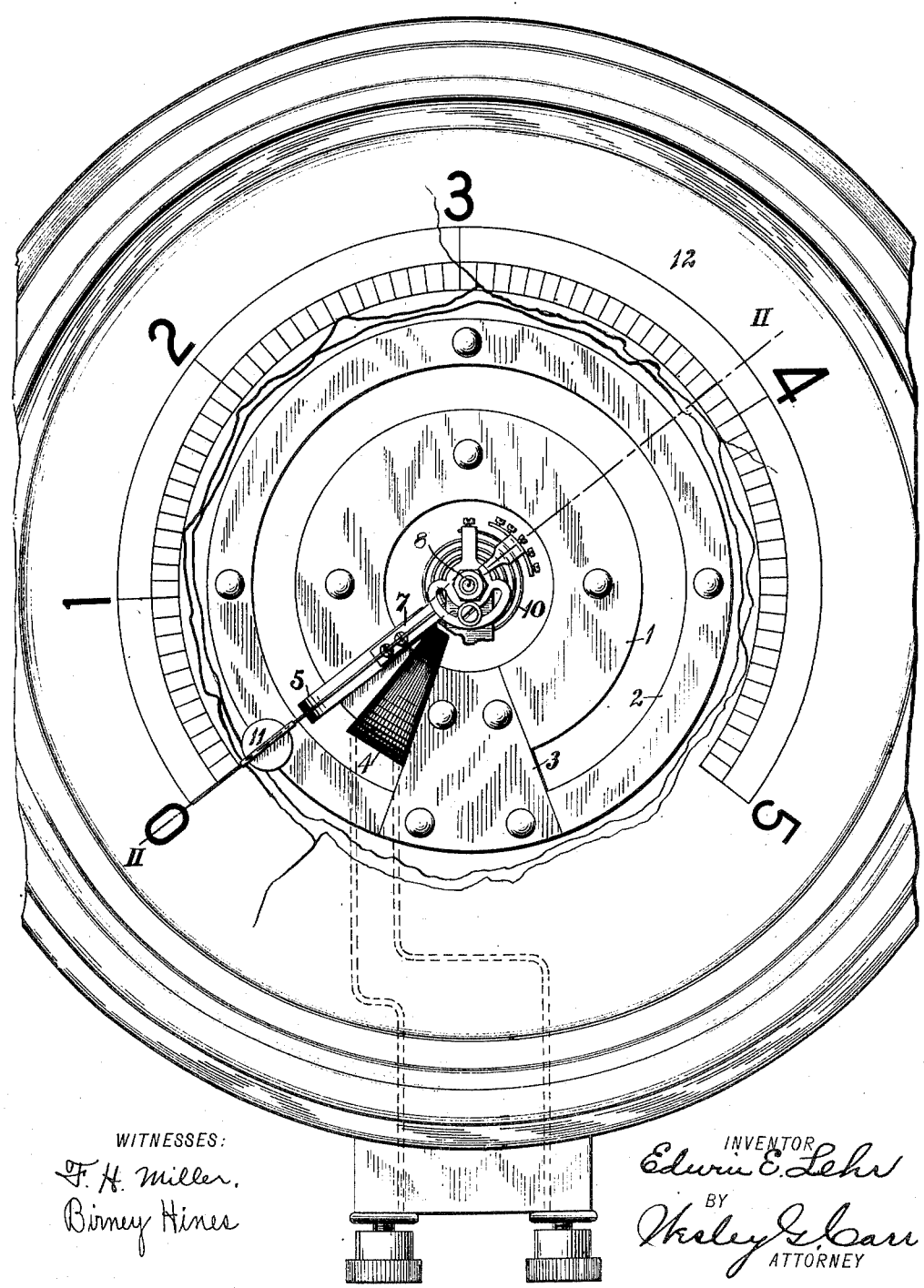
Figure 2:
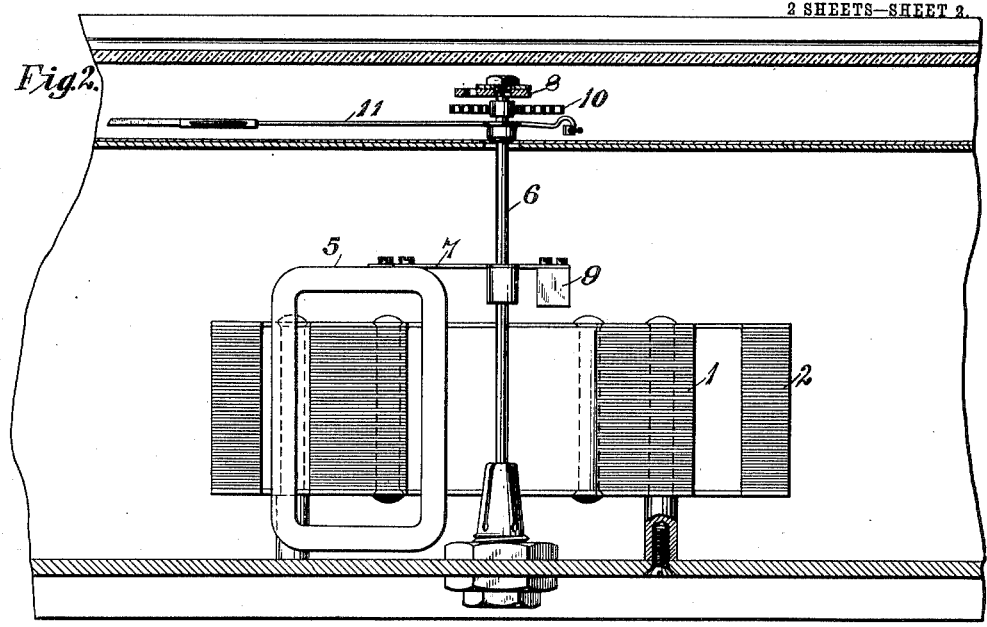
Figure 3:
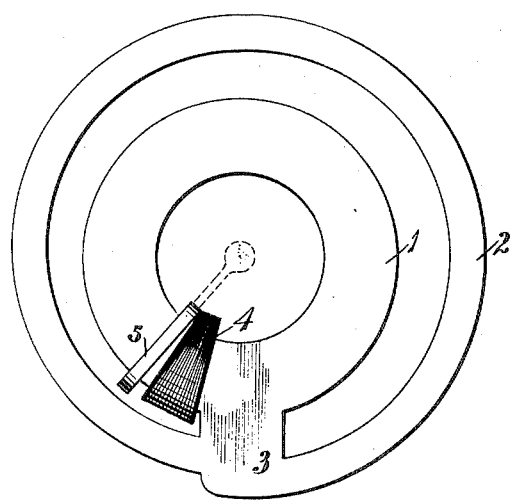

Figure 1 is a plan view or a view in front elevation, according as the instrument is of the portable or switchboard form, of an instrument constructed in accordance therewith, the central portion of the dial being broken away to show the parts of the instrument beneath it. Fig. 2 is a view in section on the line II II of Fig. 1. Fig. 3 is a diagrammatic view of an iron punching of suitable form for an ammeter having a uniform scale.

The iron core of the instrument is composed of laminæ, which severally comprise two approximately annular portions 1 and 2, the one located within the other and the two being joined by an approximately radial portion 3. The portion 1 is annular in form; but the portion 2 may be of any suitable and desired form, as will be more fully described hereinafter. The coil 4, which is wound on the portion 1 and as near as possible to the portion 3, comprises the proper number of turns for an instrument of the desired capacity and range. A movable coil 5, comprising one or more turns of a suitable conductor closed upon itself, encircles the annular portion 1 of the iron core and is secured to a shaft 6 by means of a small bracket or arm 7, the said shaft being mounted in suitable bearings 8, so that its axis coincides with the axis of the annular portion 1 of the iron core. A counterweight 9 for the coil 5 is attached to one end of the bracket 7, and the shaft 6 is provided with suitable means for opposing the torque of the movable parts, such as a spring 10. The shaft 6 is also provided with a pointer 11, which moves over a properly-graduated dial 12 in order to indicate the degree of deflection of the movable coil. The field produced in the iron core by the current in the coil 4, which is connected in a proper manner to the energizing-circuit, induces a secondary current in the movable coil 5, the field of which opposes that of the coil 4, and the coil 5 is therefore repelled from the coil 4 until the resistance exerted by the spring 10 just equals the torque due to the repelling fields.

A very desirable feature in instruments of this character is a uniform scale or one having equal divisions which represent approximately equal current values. In order to secure this result, it is necessary to make the deflections proportional to the first power of the current in the stationary coil instead of proportional to the product of the currents in the two coils. This is accomplished by providing a non-uniform air-gap between the two portions 1 and 2 of the iron core, as is shown in Fig. 3. If the air-gap were uniform, the deflection would be proportional to the product of the currents in the stationary and movable coils, and if these currents were equal the deflection would be proportional to the square of the current in the stationary coil; but by properly proportioning the air-gap the deflection may be made substantially proportional to the quantities to be measured and the scale of the instrument be therefore made uniform. The air-gap is of gradually-increasing width from the left side of the portion 3 to the right side of the same, as indicated in Fig. 3, and the form of the portion 2 of the core may be approximately that of a spiral curve, the exact form, however, being determined by experiment.

My invention may be embodied in instruments suitable for measuring voltage, as well as in those which are adapted for measuring current, and while it is my desire and intention to claim the invention herein in its broadest aspect, as well as in the form which is adapted to current measurement, I have made the voltmeter embodiment the subject-matter of a divisional application filed June 24, 1904, Serial No. 214,068.

The details of construction may of course be varied from what is shown within the scope of my invention.

I claim as my invention—

1. In an electrical measuring instrument, the combination with an iron core comprising two approximately concentric rings connected together at one side and a stationary winding on a portion of said core, of a movable coil surrounding a portion of said core, means for opposing the movement of said movable coil and means for indicating the degree of said movement.

2. In an electrical measuring instrument, the combination with a laminated iron core comprising two approximately annular portions located the one within the other and an approximately radial portion joining the same, of a stationary winding on one of the annular core portions, a movable coil surrounding said portion, means for opposing the movement of said movable coil and means for indicating the degree of said movement.

3. In an electrical measuring instrument, the combination with a laminated iron core comprising two approximately annular portions located the one within the other and a substantially radial portion joining the same, of a stationary winding on one of the annular portions, a movable coil closed upon itself and comprising one or more turns around said annular portion and adapted for movement about an axis coinciding with the axis of said portion, the plane of the coil being approximately radial to the center of the core, means for opposing the movement of said movable coil and means for indicating the degree of said movement.

4. An electrical measuring instrument having a laminated iron core composed of two approximately annular portions located the one within the other, joined by means of a substantially radial portion and separated by an air-gap that is non-uniform in such manner and degree that the deflections of the instrument are proportional to the measured currents or voltages.

5. In an electrical measuring instrument, a laminated iron core composed of two approximately annular portions the one within the other and joined by means of a substantially radial portion, the inner portion of said core being of an accurate annular shape and the outer portion being of such shape as to produce a non-uniform air-gap between the two portions in order that the deflections of the instrument may be proportional to the measured currents or voltages.

6. In an electrical measuring instrument, actuating means comprising a stationary coil, an iron core comprising two approximately annular, concentric portions and a movable coil that surrounds one of said portions and the magnetic field of which opposes that of the stationary coil.

7. In an electrical measuring instrument, actuating means comprising a stationary coil, a movable coil and an iron core comprising two approximately annular, concentric portions, the movable coil being repelled from the stationary coil by the opposing effects of their magnetic fields.

8. An electrical measuring instrument comprising a laminated iron core composed of two approximately annular portions, one within the other and joined by means of a substantially radial portion, a stationary winding on a portion of said core and a movable coil surrounding one of said annular portions.

In testimony whereof I have hereunto subscribed my name this 9th day of November, 1903.

EDWIN E. LEHR.

Witnesses:
BIRNEY HINES,
F. H. MILLER.